Nov. 1, 1938.  H. B. CLARKE  2,134,778
VISCOSITY REGULATOR
Filed May 16, 1935   3 Sheets-Sheet 1
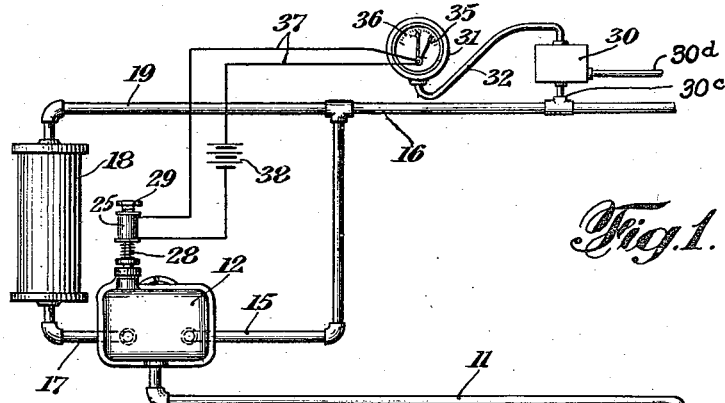
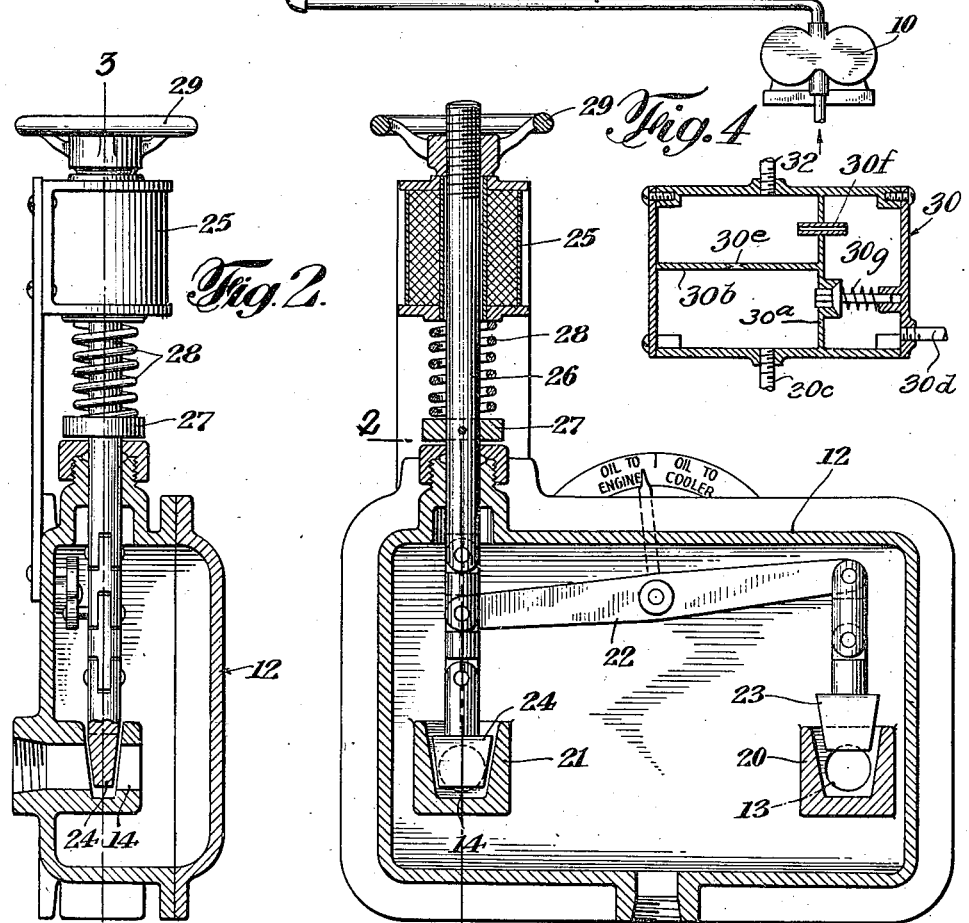
INVENTOR
Henry B. Clarke
BY Kenyon & Kenyon
ATTORNEYS.

Nov. 1, 1938.  H. B. CLARKE  2,134,778
VISCOSITY REGULATOR
Filed May 16, 1935  3 Sheets-Sheet 2
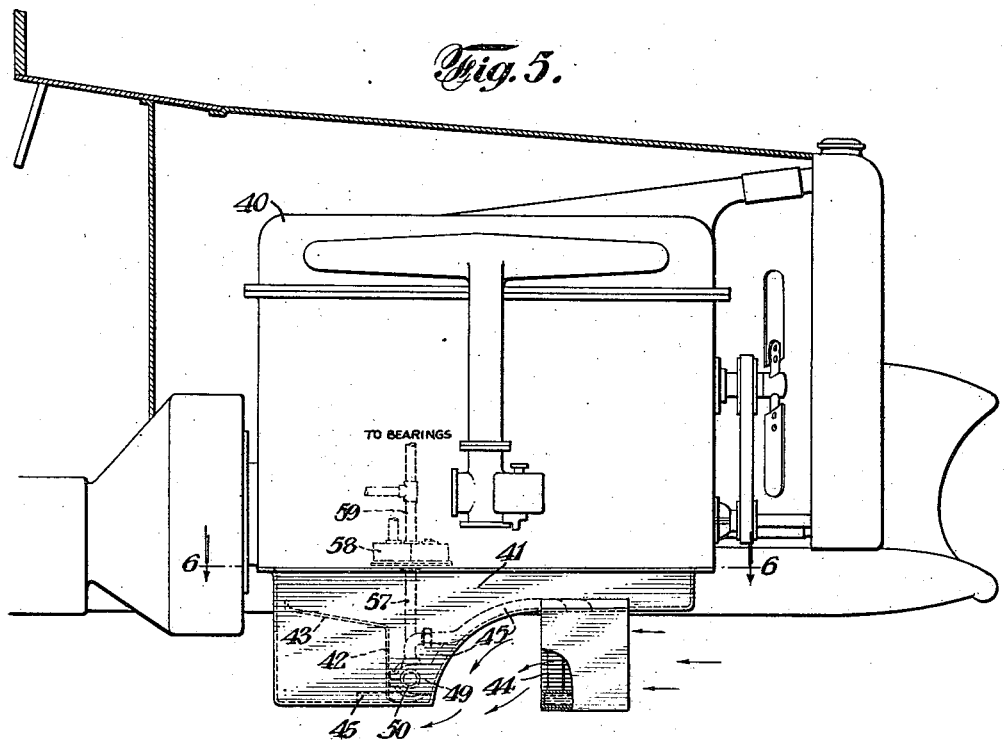
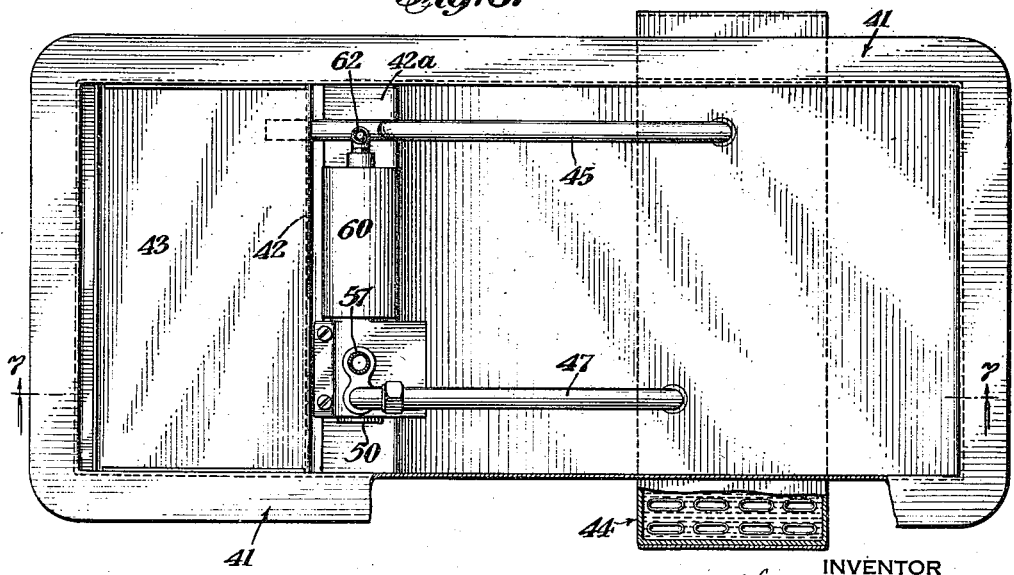
INVENTOR
Henry B. Clarke
BY Kenyon & Kenyon
ATTORNEYS.

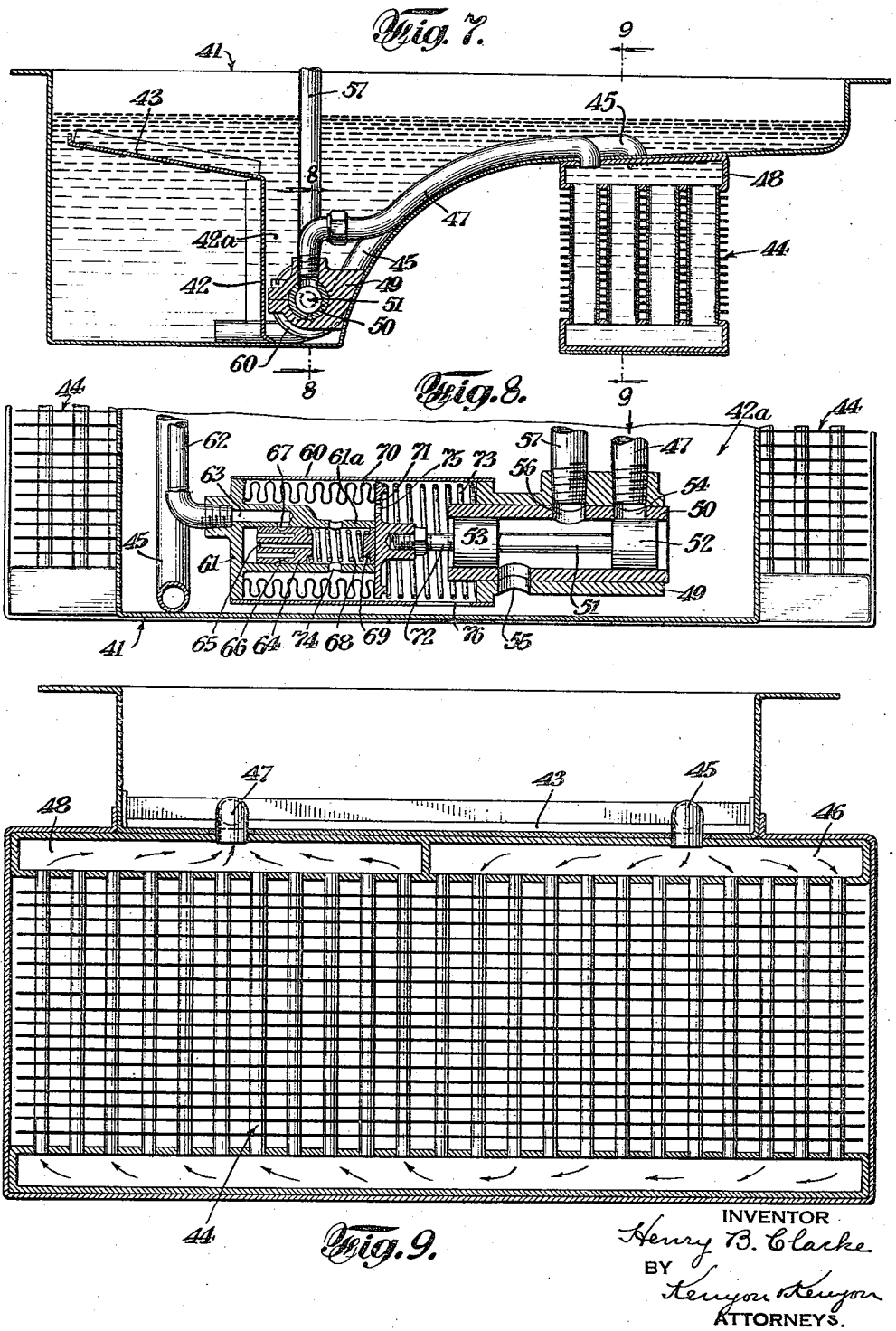

Patented Nov. 1, 1938

2,134,778

UNITED STATES PATENT OFFICE 2,134,778

VISCOSITY REGULATOR

Henry B. Clarke, Grosse Pointe, Mich., assignor, by mesne assignments, to Henry R. Gross, Chicago, Ill.

Application May 16, 1935, Serial No. 21,792

29 Claims. (Cl. 184—104)

This invention relates to viscosity regulators and this application is a continuation-in-part of copending applications of Henry B. Clarke, Serial No. 577,052, filed November 24, 1931, and Ser. No. 644,287, filed November 25, 1932.

An object of this invention is to provide simple, efficient, inexpensive and durable means in fluid systems such as circulatory lubricating systems of internal combustion engines or other machines, liquid fuel systems and the like, for regulating the viscosity of the fluid and more especially for delivering the fluid at desired viscosity to its place of use.

As embodied in the lubricating system of an internal combustion engine, the invention comprises a cooler and a by-pass therefor included in the circulatory oil path, valve means for controlling oil-flow through said cooler, a viscosity responsive device, means for by-passing a portion of the oil in the system through said device and connections between said viscosity-responsive device and the valve means for increasing oil flow through said cooler upon decrease in the viscosity of the oil supplied to said device and decrease in flow upon increase in the viscosity of the oil supplied to said device. The valve means to control the oil flow through the cooler and by-pass may comprise a valve chamber having two outlets, one communicating with the cooler and the other with the by-pass and an inlet through which oil is supplied to the chamber or may comprise a valve chamber having a single outlet and two inlets, one of which leads from the cooler and the other of which leads from the by-pass therefor. The valve chamber may be provided with oppositely actuated valves for either the two outlets or the two inlets whereby the inlet area to or the outlet area from the chamber is maintained uniform. The valves may be operated from the viscosity responsive device by electrical means or by fluid pressure means in response to change in the viscosity of the oil flowing through the viscosity responsive device. The valve means control the oil flow through the cooler and by-pass in proper ratio to deliver the oil to the bearings at the desired viscosity.

In other types of lubricating systems, fuel oil systems and the like embodying the invention, similar means are provided for dividing the fluid in two streams, one of which passes through a heat exchange device, and for regulating the flow in the two streams to deliver the fluid to its point of use at the desired viscosity.

The cooler in the lubricating system of an automotive engine preferably is in the nature of a radiator so arranged that air is forced to pass therethrough upon forward movement of the vehicle driven by the engine. In the case of an automobile engine, the radiator may be attached to the exterior of the oil pan and in the case of an airplane engine, the cooler may be supported in any convenient position.

Other objects, novel features and advantages of the invention will be apparent from the following specification and accompanying drawings, wherein:

Fig. 1 is a fragmentary view of a lubricating system embodying the invention;

Fig. 2 is a vertical section through the valve chamber on the line 2—2 of Fig. 3;

Fig. 3 is a section on the line 3—3 of Fig. 2;

Fig. 4 is a cross-section through one form of viscosity responsive device, which may be used in my invention;

Fig. 5 is a side elevation partly broken away of an automobile engine for a lubricating system embodying the invention;

Fig. 6 is an enlarged section on the line 6—6 of Fig. 5.

Fig. 7 is a section on the line 7—7 of Fig. 6;

Fig. 8 is a section on the line 8—8 of Fig. 7; and

Fig. 9 is a section on the line 9—9 of Fig. 7.

Referring now more especially to Figs. 1 to 4 inclusive, a pump 10 supplies oil from a reservoir or the like (not shown) through the pipe 11 to a valve chamber 12 having two similar outlet ports 13 and 14. The outlet pipe 15 leads from the outlet port 13 and connects with a pipe 16 leading to a device to be lubricated (not shown), such for example as the bearings of an internal combustion engine, and from which the oil is returned to the sump above mentioned. An outlet pipe 17 leads from the port 14 to a cooler 18 and a pipe 19 connects the outlet of the cooler 18 with the pipe 16.

A valve seat 20 is provided at the outlet port 13 and a valve seat 21 is provided at the outlet port 14. A centrally pivoted lever 22 is supported in the upper portion of the chamber and its ends are linked to valves 23 and 24 which are arranged to cooperate with the valve seats 20 and 21 respectively to control the flow through the outlet ports 13 and 14. The valves 23 and 24 are preferably so designed and arranged that in any position of the valves, the total outlet area from the chamber is the same; that is, the open portion of one outlet port is always the complement of the open portion of the other.

A solenoid 25 is supported above the valve chamber 12 and an iron rod 26 is connected at one end to the lever 22 and extends through the bore of the solenoid 25, this rod being in effect the armature of the solenoid. A collar 27 is fastened to the rod 26 and a spring 28 is interposed between the collar and the solenoid 25, this spring tending to force the rod 26 downwardly. The upper end of the rod 26 is threaded and a hand wheel 29 is screwed on to the same. By means of this wheel may be regulated the position assumed by the lever 22 under the influence of the spring 28.

A viscosity meter is connected to the pipe 16. There are different known types of continuous reading meters for measuring viscosity of a flowing stream of liquid and any of these meters may be used. Fig. 4 discloses in detail one well-known type of such meter in which a housing 30 is divided into three chambers by partitions 30a and 30b. A pipe 30c leads from the pipe 16 to the lower left chamber and a pressure gauge 31 is connected by a pipe 32 with the upper left chamber. A pipe 30d leads from the right chamber and discharges into the sump previously referred to. The partition 30b is provided with an orifice 30e, the resistance of which to liquid flow is substantially independent of the viscosity of the liquid and friction tube 30f leads from the upper left chamber into the right chamber, the resistance of the friction tube to liquid flow being dependent upon the viscosity of the liquid. A port is provided between the lower left chamber and the right chamber and a spring-actuated valve 30g is adapted to close such port, this valve serving to maintain constant pressure in the lower left chamber. Oil is supplied to the lower left chamber through the pipe 30c and flows through the orifice and friction tube at the same rate and is then discharged into the right chamber from which it escapes through the pipe 30d and constant pressure is maintained in the lower left chamber by means of the relief valve 30g, the pressure of oil in the pipe 30c being at all times greater than the pressure required to actuate the valve 30g. As constant pressure is maintained in the lower left chamber, oil is supplied to the orifice at constant pressure and as its resistance to flow is independent of viscosity and the rate of flow through the orifice and friction tube is the same, the pressure of the oil in the upper left chamber is a measure of the rate of flow through the friction tube and is a function of the oil viscosity. Change in the oil viscosity results in change of pressure applied to the gauge 31.

The gauge 31 comprises a casing in which is provided a calibrated scale and in which is pivotally mounted a pointer 35 adapted to be moved over the scale in response to variation in viscosity of oil flowing through the housing 30. A second pointer 36 is pivotally mounted coaxially with the pointer 35, but is arranged to be manually operated. The pointers 35 and 36 are connected by suitable electric conductors 37 with a battery 38 and the winding of the solenoid 25, the pointers being insulated from each other, but adapted to contact with each other and close the circuit through the solenoid when one pointer overlies the other.

In using the apparatus, the pointer 36 is manually set in register with the scale indication of the desired viscosity. The pump 10 draws oil from a sump or the like and forces it through the lubricating system to the device to be lubricated and the oil is then returned to the sump for recirculation. At the start, the oil is cold and of high viscosity, but after a period of use the oil becomes heated and is then of lower viscosity. Initially, therefore, the pointer 35 assumes a position at the high or right end of the scale, but as the viscosity decreases the pointer 35 gradually recedes to the left. Also, initially the rod 26 is held downwardly by the spring 28, the position of the lever 22 being determined by the position of the hand wheel 29 on the rod 26. The outlet port 13 may be wide open and the port 14 completely closed or both may be partially open, this depending upon previous experience in connection with the particular lubricating system. In any event, the arrangement is such that after a period of operation the oil will gradually become less viscous and the pointer 35 will gradually drop back until it overlies the pointer 36. The circuit will then be closed through the solenoid 25 and the rod 26 will be drawn upwardly to completely close the outlet port 13 and open the outlet port 14, thus sending all the lubricant through the cooler. The viscosity of the oil in the pipe 16 will thus be raised and cause the pointer 35 to move out of contact with the pointer 36 whereupon the solenoid will be de-energized and the spring 28 will return the valves 23 and 24 to their original position, thereby dividing the oil again into two streams of predetermined ratio. In this way, the viscosity of the oil supplied to the device to be lubricated is maintained substantially uniform.

By adjustment of the hand wheel 29 during the operation of the system, an arrangement of the valves can be arrived at which will maintain the lubricant at substantially the desired viscosity so that the automatic regulating means needs to compensate for only slight variation in viscosity, thereby making the control of the viscosity very exact.

The invention above described may be embodied in any fluid system for regulating the viscosity of lubricants, fuel oils or other similar fluids. It is within the contemplation of this invention that the fluid be supplied to the valve chamber through the branch lines and be discharged through the single pipe so that the fluid is divided into properly proportioned streams before entering the chamber and is discharged therefrom in a single stream, one of the entering streams being conditioned to change its viscosity so that the resulting single stream is of the desired viscosity. For some purposes, this arrangement is more desirable. Also, it is contemplated that the cooler may be replaced by a heater in the event that it is desired to regulate by decreasing the viscosity of one branch stream rather than increasing its viscosity.

Referring now to Figs. 5 to 9 inclusive, the internal combustion engine 40 is provided with an oil pan 41, the forward portion of which is of less depth than the rear portion. A vertical partition 42 forms a well or pocket 42a with the curved bottom of the forward portion of the oil pan, this partition terminating in a sloping shelf 43 extending nearly to the rear wall of the pan. The bottom edge of the partition 42 engages the bottom of the oil pan, but does not make a fluid tight seal therewith.

A heat exchange device or radiator 44 is suspended from the bottom of the oil pan adjacent the front end thereof. A pipe 45 leads from the chamber formed by the partition 42 and shelf 43 to the header 46 of the radiator 44 and a pipe 47 leads from the header 48 of the radiator to a casing 49 arranged in the well 42a. The casing 49 is provided with a cylindrical liner 50 in which is slidably mounted a piston valve 51 having heads 52 and 53. The pipe 47 discharges into the liner 50 through a port 54 and the interior of the liner is in communication with the well 42a through a port 55. The piston valve 51 is so designed that in one position thereof the head 52 closes the port 54 with the head 53 and the port 55 out of register while in another position the head 53 closes the port 55 with the head 52 and the port 54 out of register. The liner 50 also communicates through the port 56 with the intake pipe 57 of the pump 58 which supplies lubricant to the bearings through a pipe 59.

The casing 49 carries a housing 60 closed by a head 61. A pipe 62 leads from the pipe 59 to the head 61 and communicates with a conduit 63 formed in the head 61. The head 61 is provided with a tubular extension 61a having a cylindrical recess in which is slidably mounted a piston 64. The piston 64 is provided with a friction tube 65 and radial ports 66 extend through the piston wall, these ports being connected by a peripheral groove. A port 67 leads from the conduit 63 into the cylindrical recess and with the ports 66 comprises a valved passageway for oil to flow into the interior of the piston 64. A spring 68 is interposed between the piston 64 and a plug 69 closing the end of the cylindrical recess.

A metal bellows member 70 is attached at one end to the head 61 and at the other end to a plate 71 which is joined by a rod 72 to the head 53 of the piston 51. A spring 73 is interposed between the plate 71 and the adjacent end of the casing 49.

Ports 74 are provided for permitting passage of oil from the cylindrical recess into the chamber formed by the bellows member and an orifice 75 is provided in the plate 71 to permit passage of oil from the bellows member into the space between the plate 71 and housing 60 while an aperture 76 is provided to permit flow of oil from such space into the well 42a. The spring 73 tends to keep the plate 71 in contact with the end of the tubular portion 61a while the spring 68 tends to oppose movement of the piston 64 to the right from the position shown in Fig. 8.

When the engine is at rest, the various elements are in the position shown in Fig. 8. The peripheral groove in the piston 64 is in full register with the port 67 and the port 54 is closed while the port 55 is open. Because of the arrangement of the casing 49 and housing 60 at the bottom of the well 42a, all the chambers and spaces within the casing 60 are filled with oil. Upon starting of the engine, oil is forced by way of the pipe 62 and conduit 63 through the ports 66 and 67 into the piston 64, thence through the tube 65, ports 74, orifice 75 and aperture 76 into the well 42a. The increased pressure at the left of the piston 64 tends to move the same to the right against the back pressure produced by the resistance developed by the orifice 75 and the pressure of the spring 68 and bellows 70. Such movement of the piston cuts down the oil flow through the ports 66 and 67 and continues until the difference in pressure on the opposite sides of the piston equals the strength of the spring 68 and the spring strength of the bellows 70 and such relationship is maintained throughout the entire operation by regulatory movement of the piston back and forth in its cylinder.

When the oil is of high viscosity as is the case upon starting of the engine, the resistance of the tube 65 retards the speed of flow of oil therethrough, the resistance of such a tube varying with the viscosity of the oil. As the rate of flow of oil through the orifice 75 is substantially independent of viscosity, the back pressure on the oil in the bellows member is low and is insufficient to overcome the force exerted by the spring 73. Therefore, the piston 51 remains in the position shown with the port 54 closed and the port 55 open. With this arrangement of the piston, the by-pass through the radiator is closed and oil is drawn by the pump solely from the well 42a. After a period of operation, the oil becomes of higher temperature and consequently of lower viscosity. Therefore, with the constant pressure differential between the opposite sides of the piston 64, the rate of flow of oil through the tube 65 increases as the viscosity decreases. Such increase in flow results in a higher back pressure in the bellows member and the plate 71 is pushed to the right against the action of the spring 73 and carries the piston valve 51 into position where the port 54 is partially open and the port 55 is partially closed. In this position of the piston, oil is drawn through the radiator 44 as well as directly from the well 42a and the mixture thus obtained is supplied by the pump to the bearings. Movement of the piston to the right continues as long as the viscosity of the oil supplied to the bearings tends to decrease and the back pressure tends to increase, thereby increasing the ratio of cooled oil in the mixture supplied to the bearing. As soon as the oil reaches the desired viscosity, further movement of the valve to the right ceases and the ratio of oil drawn directly from the sump and through the by-pass remains constant.

Any decrease in viscosity of the lubricant due to change of engine speed or other cause is immediately compensated for by movement of the valve 51 to the right to increase the flow of oil through the by-pass, thereby tending to increase the ratio of cooled oil in the mixture. Any increase in viscosity is compensated for by movement of the valve 51 to the left to decrease the flow of oil through the by-pass, thereby tending to decrease the ratio of cooled oil in the mixture. Such regulatory movement of the valve maintains the oil at proper viscosity.

The viscosity at which the oil is maintained is dependent upon the spring 73. This spring prevents any movement of the valve 51 until such time as the back pressure in the bellows member exceeds the strength of the spring and bellows member and moves the piston to the left as soon as the back pressure in the bellows member decreases below such strength and, as such back pressure is a function of the viscosity of the oil, the spring 73 is designed to be of proper strength to insure maintenance of the oil at the desired viscosity.

The provision of the well 42a insures quick heating of a small portion of the oil so that the oil supplied to the bearings is quickly brought to proper viscosity. The well 42a contains but a small portion of the oil in the system and at the start of the engine only this portion is circulated. Oil dripping from the bearings is returned to the well by the shelf 43 and the curved portion of the oil pan. The valve 51 is not actuated until the viscosity of this small portion of the oil approaches the desired viscosity, thereby insuring almost immediate supply to the bearings of lubricant of proper viscosity. In the event of substantially all the oil being pumped out of the well 42a before the by-pass valve opens, oil will flow beneath the bottom edge of the partition 42 into the well 42a, thereby insuring sufficient flow of oil to the bearings.

In both embodiments of the invention above described, the circulatory path is divided over a portion of its length into two channels, in one of which is arranged a cooler. A viscosity responsive device is connected to the oil path by a branch line which by-passes flow-resisting means such, for example as engine bearings, the working parts of a machine or a fuel burner and this device is effective to control the operation of valve means to increase the flow of fluid through the cooler upon decrease in the viscosity of the fluid supplied to the viscosity-responsive device and to decrease the flow through the cooler upon increase in the viscosity of the fluid supplied to said device. While the viscosity-responsive device has been shown connected to the system to be acted upon by a mixture of the fluid flowing from the cooler and by-pass it is to be understood that the invention contemplates connection of the viscosity responsive device to the system elsewhere to divert fluid therethrough for regulation of the flow through the cooler to deliver fluid at desired viscosity to the point of use.

The particular construction of viscosity responsive device embodied in the modification illustrated in Figs. 5 to 9 inclusive, is the invention of Harry T. Booth and is disclosed in detail and claimed in his patent, No. 2,028,186 of January 21, 1936.

It is of course understood that various modifications may be made in the structure above described, without in any way departing from the spirit of the invention as defined in the appended claims.

I claim:

1. In a fluid system, a heat-exchange device, a by-pass around said heat exchange device, a conduit into which discharge both said device and said by-pass, a channel communicating with said conduit and containing viscosity responsive means operative to control flow through said heat exchange device and by-pass.

2. In a fluid system, a heat-exchange device, a by-pass around said heat exchange device, valve means for controlling flow through said heat exchange device and by-pass, a conduit into which discharge both said device and by-pass, a channel communicating with said conduit and containing viscosity responsive means operative to actuate said valve means.

3. In a fluid system, two fluid channels, a conduit communicating with both of said channels, a heat exchange device in one channel, a third channel communicating with said conduit and means in said channel responsive to the viscosity of fluid flowing therethrough for controlling flow through said channels.

4. In a fluid system, two fluid channels, a conduit communicating with both of said channels, a heat exchange device in one channel, valve means for controlling flow through said channels, a third channel communicating with said conduit, and means in said channel responsive to the viscosity of fluid flowing therethrough for actuating said valve means.

5. In a fluid system, a pair of fluid channels, a conduit communicating with both of said channels, a heat exchange device in one channel, valve means for controlling flow through said channels and maintaining constant the total flow area therethrough, and viscosity responsive means connected to said conduit for operation upon by fluid flowing in said conduit and operative to actuate said valve means.

6. In a circulatory fluid system, a fluid path divided over a portion of its length into two channels, a cooler in one channel, a viscosity responsive device including a chamber wherein the pressure of the fluid flowing therethrough is a function of its viscosity, a branch path for by-passing fluid from said first path through said viscosity responsive device, and valve means responsive to pressure variations in said chamber for controlling flow through said cooler to increase the flow upon decrease in the viscosity of the fluid supplied to said device and decrease the flow upon increase in the viscosity of the fluid supplied to said device.

7. In a circulatory fluid system, a fluid path divided over a portion of its length into two channels, a cooler in one channel, a viscosity responsive device including a chamber wherein the pressure of the fluid flowing therethrough is a function of its viscosity, a branch path for by-passing fluid from said first path through said viscosity responsive device, and valve means responsive to pressure variations in said chamber for controlling flow through said channels to increase the flow through the cooler channel and decrease the flow through the other channel upon decrease in the viscosity of the fluid supplied to said device and to decrease the flow through said cooler channel and increase the flow through said other channel upon increase in the viscosity of the fluid supplied to said device.

8. In a fluid system, a pair of fluid channels, a conduit communicating with said channels, a heat exchange unit in one of said channels, viscosity responsive means including a chamber wherein the pressure of the fluid flowing therethrough is a function of its viscosity, connections for supplying fluid from said conduit to said viscosity responsive means, and means responsive to the pressure in said chamber for controlling flow through said channels.

9. In a fluid system, a pair of fluid channels, a conduit communicating with said channels, a heat exchange unit in one of said channels, valve means for controlling flow through said channels, viscosity responsive means including a chamber wherein the pressure of the fluid flowing therethrough is a function of its viscosity, connections for supplying fluid from said conduit to said viscosity responsive means, and means responsive to the pressure in said chamber for actuating said valve means.

10. In an oil circulating system, an oil path, a heat exchanger in said path, a by-pass around said heat exchanger, viscosity responsive means communicating with said oil path at a point exterior of the ends of said by-pass and including a chamber wherein the pressure of the oil flowing therethrough is a function of its viscosity, and valve means responsive to the oil pressure in said chamber for controlling flow through said heat exchanger.

11. In a circulating fluid system, a heat exchange unit, a conduit leading to and away from said unit, a by-pass around said unit, viscosity responsive means including a chamber wherein the pressure of fluid flowing therethrough is a function of its viscosity, a pipe leading from said conduit to said chamber, the junction of said by-pass and conduit lying between said heat exchange unit and the junction of said pipe with said conduit, and means responsive to the fluid pressure in said chamber for controlling the flow through said heat exchange unit and said by-pass.

12. In combination, a circulatory fluid path divided over a portion of its length into two channels and including flow-resisting means, a by-pass around said flow-resisting means, a cooler included in one channel, valve means for controlling flow through said cooler, and viscosity responsive means in said by-pass for operating said valve means to increase the flow through said cooler upon decrease in the viscosity of the oil supplied to said viscosity responsive means and to decrease the flow upon increase in the viscosity of fluid supplied to said means.

13. In a circulatory fluid system, a fluid path divided over a portion of its length into two channels, a cooler in one channel, a branch path for by-passing fluid from said first path, and means for controlling flow through said cooler in response to variations in the viscosity of the oil flowing through said branch path to increase the flow through said cooler upon decrease in the viscosity of the fluid in said branch path and decrease the flow upon increase in the viscosity of the fluid in said branch path.

14. In a fluid system, a valve chamber, a conduit having branches communicating with said chamber, a heat exchange unit in one of said branches, a second conduit communicating with said valve chamber, one of said conduits serving to conduct fluid to said chamber and the other serving to conduct fluid away from said chamber, and means responsive to the viscosity of fluid in the latter conduit for controlling flow through said branches.

15. In a fluid system, a valve casing having three ports, a conduit having branches communicating with two of said ports, a second conduit communicating with the third port, a heat exchange unit in one of said branches, viscosity responsive means connected to one of said conduits and comprising a chamber wherein the pressure of fluid flowing therethrough is a function of its viscosity, and a valve in said casing responsive to pressure variations in said chamber for controlling flow through said heat exchange unit.

16. In a fluid system, a valve chamber, a conduit having branches communicating with said chamber, a heat exchange unit in one of said branches, a second conduit communicating with said valve chamber, one of said conduits serving to conduct fluid to said chamber and the other serving to conduct fluid away from said chamber, viscosity responsive means connected to one of said conduits and including a chamber wherein the pressure of the fluid flowing therethrough is a function of its viscosity, and means responsive to the pressure in said chamber for controlling flow through said branches.

17. In combination with an internal combustion engine, a lubricating system therefor comprising a pair of oil channels, a heat exchange device in one of said channels, a common conduit into which both of said channels discharge and leading to the engine bearings, valve means for regulating flow through said channels, viscosity responsive means connected to said conduit and including a chamber wherein the pressure of liquid flowing therethrough is a function of its viscosity, and means responsive to the pressure in said chamber to actuate said valve means.

18. In combination with an internal combustion engine, a lubricating system therefor comprising a pair of oil channels, a heat exchange device in one of said channels, a common conduit into which both of said channels discharge and leading to the engine bearings, viscosity responsive means connected to said conduit and including a chamber in which the pressure of the liquid flowing therethrough is a function of its viscosity, and means responsive to the pressure in said chamber for controlling flow through said heat exchange device.

19. In a lubricating system for internal combustion engines, a circulating oil path, a heat exchanger in said path, a by-pass around said heat exchanger, viscosity responsive means communicating with said oil path at a point exterior of the ends of said by-pass and including a chamber wherein the pressure of the oil flowing therethrough is a function of its viscosity, and valve means responsive to the oil pressure in said chamber for controlling flow through said heat exchanger.

20. In a lubricating system for internal combustion engines, a circulatory oil path divided over a portion of its length into two channels, a cooler in one channel, a viscosity responsive device including a chamber wherein the pressure of the oil flowing therethrough is a function of its viscosity, a branch path for by-passing oil from said first path through said viscosity responsive device, and valve means responsive to pressure variation in said chamber for controlling flow through said cooler to increase the flow upon decrease in the viscosity of the oil supplied to said device and decrease the flow upon increase in the viscosity of the oil supplied to said device.

21. In a lubricating system for internal combustion engines, a circulatory oil path divided over a portion of its length into two channels, a cooler in one channel, a viscosity responsive device including a chamber wherein the pressure of the oil flowing therethrough is a function of its viscosity, a branch path for by-passing oil from said first path through said viscosity responsive device, and valve means responsive to pressure variations in said chamber for controlling flow through said channels to increase the flow through the cooler channel and decrease the flow through the other channel upon decrease in the viscosity of the oil supplied to said device and to decrease the flow through said cooler and increase the flow through said other channel upon increase in the viscosity of the oil supplied to said device.

22. In a lubricating system for internal combustion engines, an oil path divided over a portion of its length into two channels and including a pump, an oil reservoir and flow-resisting means, a by-pass around said flow-resisting means, a cooler in one channel, valve means for controlling flow through said cooler channel, and viscosity responsive means in said by-pass for operating said valve means to increase the flow through said cooler upon decrease in the viscosity of the oil supplied to said viscosity responsive means and decrease the flow upon increase in the viscosity of the oil supplied to said means.

23. In an automobile engine lubricating system, an oil pan of less depth at its front end than at its rear end, a heat exchange device supported from the bottom of said oil pan near its front end, an oil pump, a conduit leading from said oil pump to the engine bearings, connections for supplying oil to said pump from said pan directly and through said heat exchange device, valve means for controlling oil flow through said connections, and viscosity responsive means connected to said conduit for actuating said valve means.

24. In an automobile engine lubricating system, an oil pan having its front end of less depth than its rear end, a heat exchange device suspended from the bottom of said oil pan near its front end, a valve housing having a port communicating with the interior of said pan, a by-pass leading from the interior of said pan through said heat exchange device to said valve housing, a valve controlling flow through said port and by-pass, a pump having its inlet communicating with said valve housing, a conduit leading from said pump to the engine bearings, and viscosity-responsive means connected to said conduit for actuating said valve.

25. In an automobile engine lubricating system, an oil pan having its front end of less depth than its rear end, a vertical partition in said oil pan forming a well with the front part of the bottom of said pan, a valve housing arranged in said well, said valve housing having an inlet port communicating with the interior of said well, a heat exchange device suspended from the bottom of said pan near the front end thereof, a by-pass leading from the interior of said pan through said heat exchange device to said valve housing, a valve for controlling flow through said port and by-pass, a pump having its inlet communicating with said valve housing, a conduit leading from said pump to the engine bearings, and viscosity-responsive means connected to said conduit for actuating said valve.

26. In a lubricating system for automobile engines, an oil path including a pump, an oil reservoir and engine bearings, a cooler supported in position to be traversed by an air stream upon forward movement of the automobile driven by said engine, a by-pass around said cooler, valve means for controlling flow through said cooler and by-pass, a branch path for by-passing oil around said bearings, and viscosity responsive means in said branch path for operating said valve means to control flow through said cooler and by-pass to maintain the oil supplied to the bearings at substantially uniform viscosity.

27. In a fluid system, a fluid path divided over a portion of its length into two channels, a heat exchange device in one channel, a branch path for by-passing fluid from said first path, a chamber in said branch path having inlet and outlet ports of which one comprises a friction tube and the other comprises an orifice, means for maintaining at constant pressure fluid supplied to said inlet port, and valve means responsive to the pressure in said chamber for controlling flow through said heat exchanger.

28. In a fluid system, a valve chamber, a conduit having branches communicating with said chamber, a heat exchange unit in one of said branches, valve means in said chamber for controlling flow through said branches, a second conduit communicating with said valve chamber, one conduit serving to conduct fluid to said chamber and the other conduit serving to conduct fluid away from said chamber, and electro-magnetic means responsive to the viscosity of the fluid in one of said conduits for actuating said valve means.

29. In a fluid system, a valve chamber, a conduit having branches communicating with said chamber, a heat exchange unit in one of said branches, valve means in said chamber for controlling flow through said branches, a second conduit communicating with said valve chamber, one conduit serving to conduct fluid to said chamber and the other conduit serving to conduct fluid away from said chamber, electro-magnetic means for actuating said valve means, and an energizing circuit for said electro-magnet means, said circuit including a stationary contact and a contact movable in response to variation in the viscosity of the fluid in one of said conduits.

HENRY B. CLARKE.